United States Patent
Bray et al.

(10) Patent No.: US 6,430,695 B1
(45) Date of Patent: Aug. 6, 2002

(54) NETWORK TRANSCEIVER HAVING CIRCUITRY FOR REFERENCING TRANSMIT DATA TO A SELECTED INPUT CLOCK

(75) Inventors: Michael Richard Bray; Qing He, both of San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/289,951

(22) Filed: Apr. 13, 1999

Related U.S. Application Data

(60) Provisional application No. 60/082,183, filed on Apr. 17, 1998.

(51) Int. Cl.⁷ .............................. G06F 1/04; G06F 13/00
(52) U.S. Cl. ........................ 713/501; 375/219; 375/211
(58) Field of Search .......................... 370/503; 375/219, 375/211; 713/400, 501

(56) References Cited

U.S. PATENT DOCUMENTS

| | | | | |
|---|---|---|---|---|
| 5,754,540 A | * | 5/1998 | Liu et al. ..................... | 370/315 |
| 5,812,594 A | * | 9/1998 | Rakib ......................... | 375/219 |
| 6,018,526 A | * | 1/2000 | Liu et al. ..................... | 370/401 |
| 6,052,751 A | * | 4/2000 | Runaldue et al. ............ | 710/107 |
| 6,069,897 A | * | 5/2000 | Perlman et al. ............. | 370/420 |
| 6,154,464 A | * | 11/2000 | Feuerstraeter et al. ...... | 470/463 |
| 6,215,816 B1 | * | 4/2001 | Gillespie et al. ............ | 375/219 |
| 6,222,852 B1 | * | 4/2001 | Gandy ........................ | 370/463 |
| 6,269,104 B1 | * | 7/2001 | McLaughlin et al. ....... | 370/464 |
| 6,275,501 B1 | * | 8/2001 | Lucas et al. ................. | 370/463 |

FOREIGN PATENT DOCUMENTS

| EP | 863640 A2 | * | 9/1998 |
|---|---|---|---|
| WO | WO 98/51044 | * | 11/1998 |

\* cited by examiner

*Primary Examiner*—Kenneth R. Coulter

(57) ABSTRACT

A novel system for selectively referencing transmit data transferred from a repeater to a physical layer transmitter via a Media Independent Interface (MII), to an input clock selected depending on a mode of MII operations. A clock select input determines whether transmit data is referenced to a selected input clock or to a MII transmit clock output. An analog phase-locked loop (APLL) is supplied with the selected input clock to produce a signal for driving a wave shaper that converts the MII transmit data into a required format for 10 Mb/s operations.

20 Claims, 5 Drawing Sheets

NETWORK TRANSCEIVER HAVING CIRCUITRY FOR REFERENCING TRANSMIT DATA TO A SELECTED INPUT CLOCK

This application claims priority from provisional patent application serial No. 60/082,183 filed on Apr. 17, 1998, and entitled "Quad Fast Ethernet Transceiver for 10 BASE-T/100 BASE-X (QFEX 10/100)," the entire disclosure of which is incorporated by reference herein.

FIELD OF THE INVENTION

The present invention relates to network interfacing, and more particularly to a novel network transceiver having circuitry for selectively referencing transmit data to a required input clock.

BACKGROUND ART

A Local Area Network, or (LAN), is a communication system that provides a connection among a number of independent computing stations within a small area, such as a single building or group of adjacent buildings. One type of network structure uses one or more repeaters in a star topology, with each repeater having several ports. A data packet received at one port is retransmitted to all other ports of the repeater. Each repeater in turn restores timing and amplitude degradation of data packets received at one port and retransmits the packets to all other ports.

Traditional Ethernet networks (10 BASE-T) operate at 10 Mb/s Ethernet protocol, as described by IEEE Standard 802.3; the majority of Ethernet interfaces currently operate at this data rate. However, a newer Ethernet standard, under IEEE standard 802.3 u, accomplishes the faster operation of 100 BASE-T systems, at a 100 Mb/s data rate (i.e., a 125 Mb/s encoded bit rate) using unshielded twisted pair (UTP) physical media. The 100 BASE-T standard defines operation over two pairs of category 5 UTP (100 BASE-TX) or category 3 UTP. The 100 BASE-FX network medium, covered by the 100 BASE-T standard, allows operation over dual fiber optic cabling. Ethernet protocol provides for a Media Access Control (MAC), enabling network interface devices at each network node to share accesses to the network medium. One type of connection, termed a Media Independent Interface, or MII, connects the MAC to a physical layer (PHY) transceiver configured for a particular network medium, e.g., 10 BASE-T, 100 BASE-FX, or 100 BASE-TX. The physical layer transceiver is configured for converting the MII protocol signals output by the MAC into analog network signals, such as Multiple Layer Transition-3 (MLT-3) signals for 100 Mb/s Ethernet networks, or Manchester-encoded signals for 10 Mb/s Ethernet networks.

In a conventional MII, a transmit output clock TX_CLK supplied to the repeater provides the timing reference for the transfer of transmit data TXD from the repeater to the PHY transceiver. However, the repeater may be interfaced to multiple PHY transceivers, each of which provides the repeater with the transmit clock. Since different transmit clocks TX_CLK have phase variations with respect to each other, it is difficult to provide a repeater arrangement that produces transmit data referenced to different transmit clocks.

Therefore, it would be desirable to reference transmit data TXD to an input clock shared by multiple PHY transceivers, rather than to an output clock. For example, a 25 MHz input clock used to generate internal clock in a PHY transceiver may be utilized to provide the timing reference for the transfer of transmit data. However, as discussed in our copending application Ser. No. 09/289,950 filed 4/13/1999 and entitled NETWORK TRANSCEIVER HAVING MEDIA INDEPENDENT INTERFACE OPERABLE IN A GENERAL PURPOSE SERIAL INTERFACE MODE, for 10 Mb/s data, MII can be switched into a serial interface mode, in which the PHY transceiver uses a 10 MHz clock, instead of a 25 MHz clock. Therefore, in order to support MII operations in different modes, it would be desirable to provide a network transceiver with ability to selectively reference transmit data to a required input clock.

DISCLOSURE OF THE INVENTION

The invention provides a novel network transceiver for transferring network signals between a repeater and a link partner in a local area network, such as one conforming to Ethernet/IEEE 802.3 Standard. The transceiver comprises a physical layer device, an interface, such as a media independent interface (MII ) conforming to IEEE Std. 802.3u, which provides the transfer of transmit data from the repeater to the physical layer device, a first clock input for providing a first reference clock signal, a second clock input for providing a second reference clock signal, and a transmit data referencing circuit that selectively employs the first or the second reference clock signal as a timing reference for transfer of the transmit data.

In accordance with one aspect of the invention, the transmit data referencing circuit is arranged to reference the transmit data to the first reference clock signal, such as a 25 MHz clock, when the interface operates in a first data rate mode of the data transfer. When the interface operates in a second data rate mode, the second reference clock signal, such as a 10 MHz clock, is used to provide the timing reference for the transfer of the transmit data.

The MII protocol requires a transmit clock output signal to be transferred from the physical layer device to the repeater. The transceiver may comprise a clock select input that enables a user to control referencing transmit data. When the clock select input is in a first state, the transmit clock output signal is employed to provide the timing reference for the transfer of the transmit data. When the clock select input is in a second state, the transmit data is selectively referenced to the first or the second reference input clock.

The physical layer device may be operable at a first and a second data rate, such as 10 Mb/s and 100 Mb/s. In accordance with a further aspect of the invention, when the physical layer device operates at the first data rate, the transmit data is selectively referenced to the first reference clock signal. When the physical layer device operates at the second data rate, the transmit data is selectively referenced to the second reference clock signal.

In accordance with a method of the present invention, the following steps are carried out for transferring network data between a repeater and a link partner:
  arranging a media independent interface (MII) for transferring transmit data from the repeater to a physical layer device, which produces transmit network signals in a format appropriate for the link partner,
  referencing the transmit data to a first reference clock signal when the MII operates in a first mode, and
  referencing the transmit data to a second reference clock signal running at a frequency different from the frequency of the first reference clock signal when the MII operates in a second mode.

BEST MODE FOR PRACTICING THE INVENTION

Figure 1:
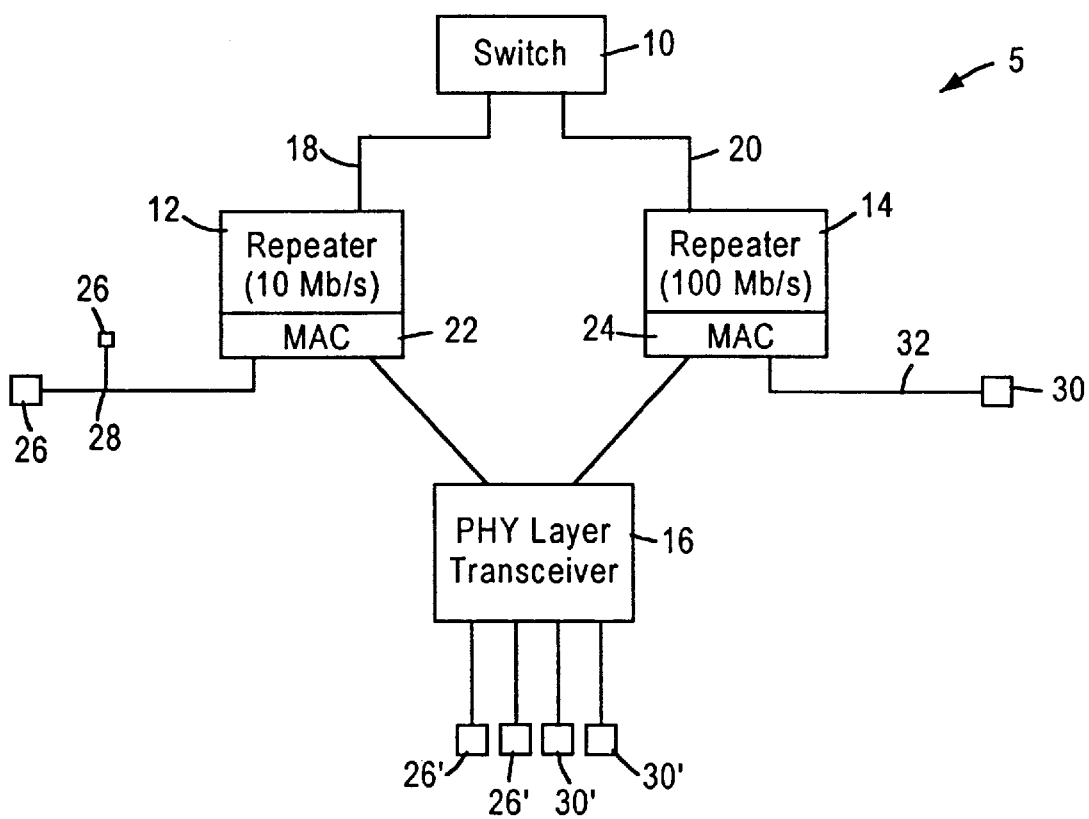
FIG. 1 is a diagram of a local area network, in which the present invention may be implemented.

FIG. 1 is a block diagram of an exemplary local area network architecture in which the present invention may be implemented. As shown in FIG. 1, the network 5 includes a network switch 10, a repeater 12 operating at a first data rate such as 10 Mb/s, a second repeater 14 operating at a second data rate such as 100 Mb/s, and a multiple port physical layer (PHY) transceiver 16. The switch 10 and the repeater 12 transfer network data via a data link 18 operating at the first data rate of 10 Mb/s. The switch 10 and the repeater 14 transfer data via a different data link 20 operating at the second data rate of 100 Mb/s. The repeaters 12 and 14 may communicate with the PHY transceiver 16 via Media Access Control (MAC) interfaces 22 and 24, respectively. As recognized in the art, the repeater 12 may also transfer network data to individual network workstations 26 operating at 10 Mb/s via a shared medium 28, and the repeater 14 may transfer data to network workstations 30 operating at 100 Mb/s via a network medium 32.

The multiple port physical layer transceiver 16 enables multiple workstations 26', 30' having different data rates of 10 Mb/s and 100 Mb/s, respectively, to communicate with the repeater interfaces 22 and 24. Moreover, the physical layer transceiver 16 enables the network data from different workstations 26' and 30' to be automatically supplied (i.e., steered) to the appropriate data rate domain, enabling more flexible implementation of multiple-rate networks.

Figure 2:
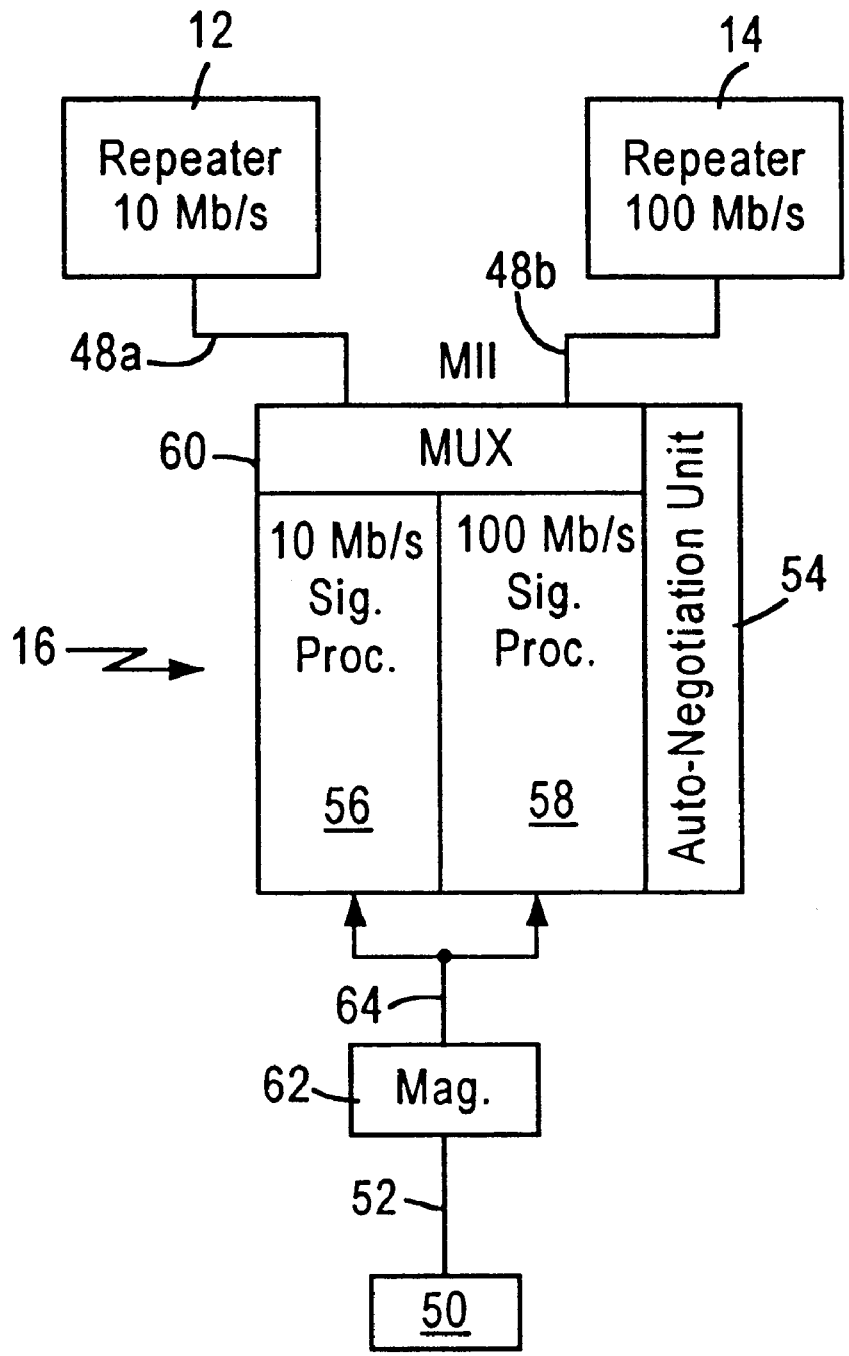
FIG. 2 is a simplified diagram of a single-port network transceiver of the present invention.

FIG. 2 shows a PHY transceiver 16 for establishing a communication path between a link partner 50 on a network medium 52 and one repeater interface from among a plurality of repeater interfaces that is data rate compatible with the operating speed (i.e., link speed) of the link partner 50. Although a single-port PHY transceiver 16 is illustrated in FIG. 2, the transceiver may have multiple ports for connecting multiple link partners 50.

The transceiver 16 has Media Independent Interfaces (MII) 48a and 48b respectively operating at 10 Mb/s and 100 Mb/s for connecting the transceiver to the corresponding 10 Mb/s and 100 Mb/s repeaters 12 and 14. The MII 48a and 48b may be shared by multiple ports of the PHY transceiver 16. An auto-negotiation unit 54 determines the speed of operation of link partner 50 on the network medium 52 using the auto-negotiation technique defined in the IEEE 802.3u standard.

The transceiver 16 includes a first data rate path 56 for converting network data between MII format and 10 Mb/s Manchester-encoded signals for transmission and reception at 10 Mb/s, and a second data rate path 58 for supporting communication at 100 Mb/s. The second data rate path 58 converts network data between MII format and a selected 100 Mb/s signal format, such as MLT-3 encoded signals.

A multiplexer 60 routes the output of the data paths 56 or 58 to the corresponding repeater 12 or 14 via MII bus 48a or 48b, based on the data rate selected for communications between the link partner 50 and the repeater. Hence, network data from the link partner 50 is transmitted via the medium 52 to a physical interface 64 of the PHY transceiver 16 via a magnetic coupler 62. As known in the art, the magnetic coupler 62, coupled to the unshielded twisted pair (UTP) medium 52, provides AC coupling between the PHY interface 64 and the medium 52, plus electrical isolation. Depending on the determined data rate, the received analog network signals are supplied to the appropriate data path 56 or 58 to recover the network data in digital format from the received analog signals. The network data, recovered from the analog network signals, is then supplied by the appropriate data path 56 or 58 via MII buses 48a or 48b to the repeater 12 or 14.

Transmit data TXD sent by the repeater 12 or 14 to the link partner 50, is supplied via the MII 48a or 48b to the appropriate data path 56 or 58, which transforms the data into a selected format, such as MLT-3 for 100 Mb/s data and 10 BASE-T for 10 Mb/s data. A 25 MHz input clock is supplied to the transceiver 16 for synchronizing its internal operations.

For 10 Mb/s data, in addition to a regular parallel mode, the MII has a serial interface mode, such as General Purpose Serial Interface (GPSI) mode, in which a serial data stream is transferred between the repeater 12 and the transceiver 16. A 10 MHz input clock is provided to the transceiver 16 for synchronizing operations in the serial MII mode.

A conventional MII uses a transmit clock TX_CLK to provide the timing reference for the transfer of transmit data from the corresponding repeater. However, the repeater may be interfaced to multiple PHY transceivers, each of which provides the repeater with the transmit clock. Since different transmit clocks TX_CLK have phase variations with respect to each other, it is difficult to provide a repeater arrangement that produces transmit data referenced to different transmit clocks.

Figure 3:
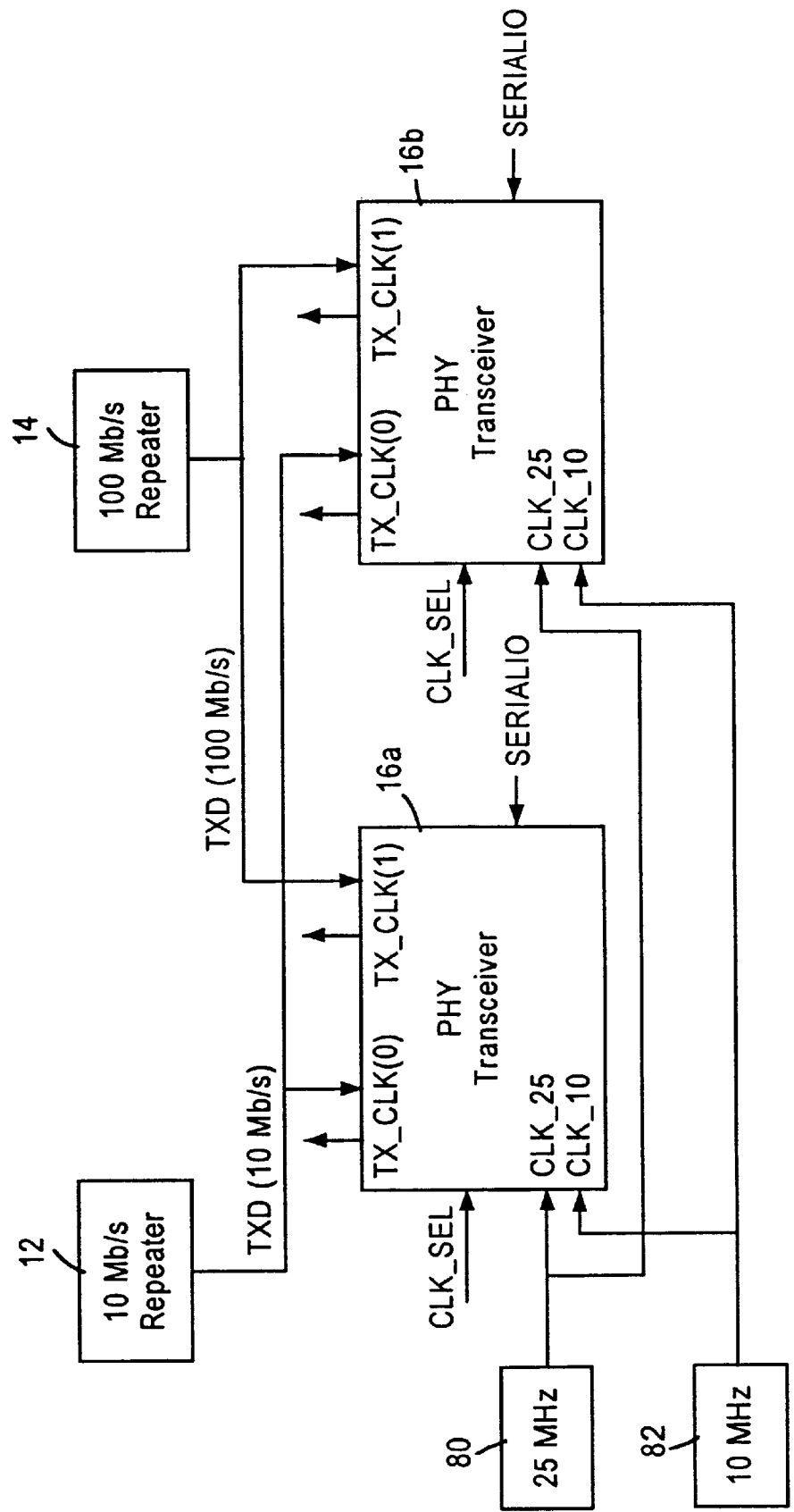
FIG. 3 is a diagram illustrating multiple transceivers coupled to a single repeater core.

FIG. 3 illustrates PHY transceivers 16a and 16b in accordance with the present invention that use a selected input clock to provide the timing reference for the transfer of transmit data. The transceivers 16a and 16b are supplied with 10 Mb/s transmit data TXD from the 10 Mb/s repeater 12 and with 100 MB/s transmit data TXD from the 100 Mb/s repeater 14. In accordance with a conventional MII protocol, each transceiver should produce a transmit clock outputs TX_CLK[1:0] for the repeaters 12 and 14. For example, the transmit clock output TX_CLK[0] may be used in the MII that connects to the 10 Mb/s repeater 12, whereas the TX_CLK[1] output may be produced in the MII to the 100 Mb/s repeater 14.

External reference clock generators 80 and 82 respectively provide each of the PHY transceivers 16a and 16b with a 25 MHz input reference clock CLK_25 and a 10 MHz input reference clock CLK_10. The CLK_25 is used to generate an internal 125 MHz clock for synchronizing signal processing operations.

The CLK_10 is used to produce an internal 100 MHz clock for synchronizing operations of the 10 Mb/s data path 56 when the MII is configured to operate in a serial interface mode, such as a GPSI mode described in more detail in our copending application No.09/289,950 filed on Apr. 13, 1999 and entitled NETWORK TRANSCEIVER HAVING MEDIA INDEPENDENT INTERFACE OPERABLE IN A GENERAL PURPOSE SERIAL INTERFACE MODE, which is incorporated by reference herein.

As will be discussed in more detail later, each of the transceivers 16a and 16b has a circuit for selectively referencing the transmit data TXD to the CLK_25 input or CLK_10 input. Moreover, each of the transceivers 16a and 16b has a clock select input CLK_SEL that determines whether the MII transmit clock TX_CLK or a selected input reference clock (CLK_25 or CLK_10) provides the timing reference for the transfer of transmit data TXD. For example, if the clock select input CLK_SEL is set at a high level, the selected input reference clock CLK_25 or CLK_10 is used for synchronizing transmit data TXD. If the CLK_SEL input is at a low level, the transmit data TXD is referenced to the corresponding transmit clock TX_CLK[1] or TX_CLK[0].

Figure 4:
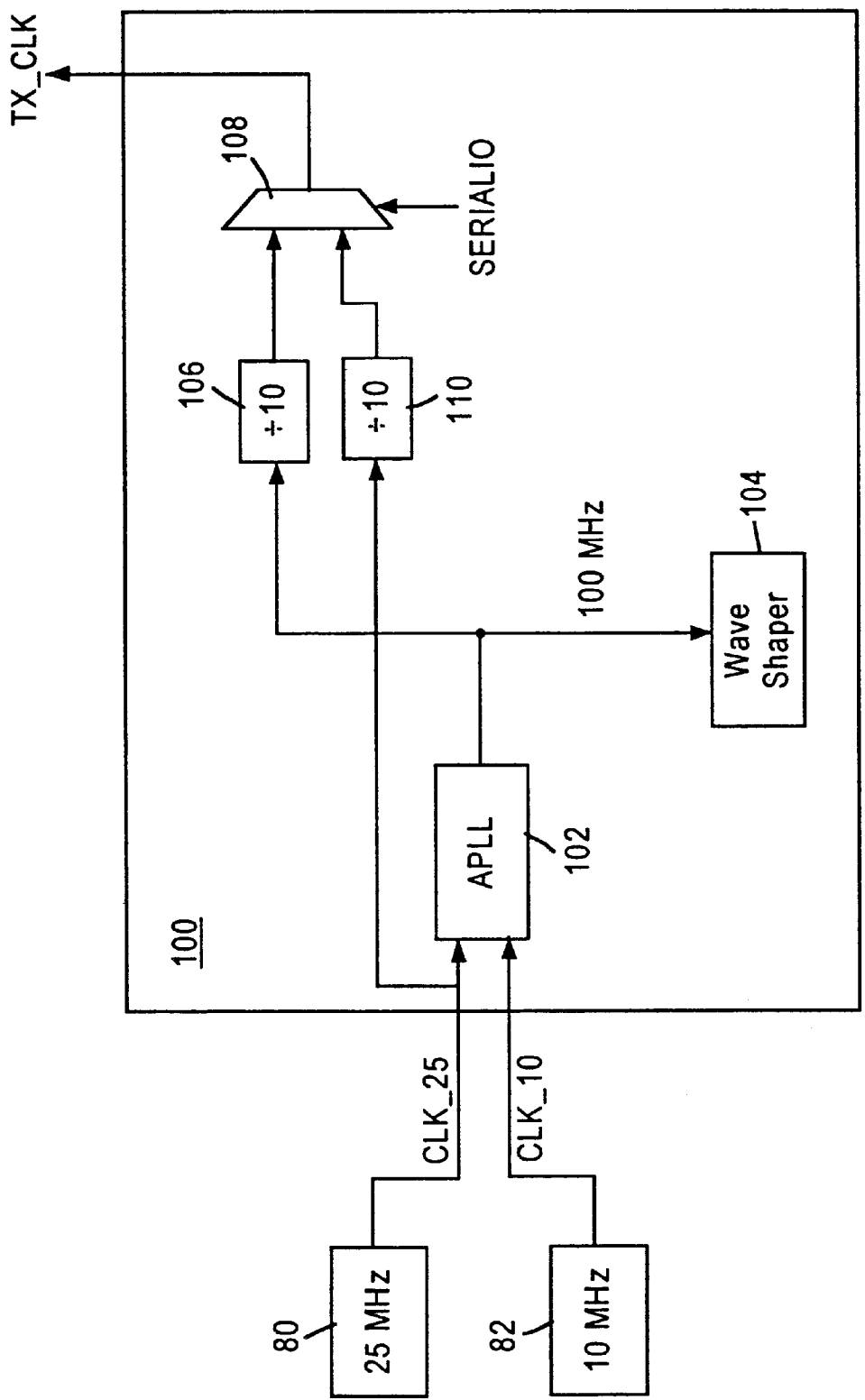
FIG. 4 is a diagram illustrating selective referencing of transmit data to a first or a second clock input.

FIG. 4 schematically illustrates the circuit 100 for selectively referencing 10 Mb/s transmit data TXD to the input reference clock CLK_10. The referencing circuit 100 comprises an analog phase-locked loop (APLL) 102 supplied with either the 25 MHz input clock signal CLK_25 or the 10 MHz input clock signal CLK_10. If the MII handles 10 Mb/s data in a parallel mode, the APLL 102 is fed with the 25 MHz reference clock input CLK_25. In this mode, the CLK_10 input is tied to ground. However, in a GPSI mode of the MII operations, the CLK_10 input running at 10 MHz is supplied to the APLL 102. In response to either the CLK_25 input or the CLK_10 input, the APLL 102 produces a 100 MHz signal that drives a wave shaper 104 arranged on the transmit side of the 10 Mb/s data path 56 for transforming 10 Mb/s transmit data TXD into a 10 BASE-T network transmit signal.

The transceivers 16a and 16b may have serial mode select inputs SERIAL10 for selecting a parallel or serial MII mode for 10 Mb/s data. For example, if the SERIAL10 input is at a high level, the MII is configured to transfer 10 Mb/s data in a serial mode, and the 10 MHz clock input CLK_10 is supplied to the APLL 102. However, when the SERIAL10 input is at a low level, the MII remains in a parallel mode, and the APLL 102 is fed with the 25 MHz clock input CLK_25.

Thus, for 10 Mb/s data, the 10 MHz input clock CLK_10 may be selectively used to provide the timing reference for MII transmit data TXD depending on the MII mode of operation. For 100 Mb/s data, only the 25 MHz input clock CLK_25 is used for referencing transmit data TXD. The CLK_25 signal is converted into a 125 MHz internal signal that drives the transmit circuitry of the 100 Mb/s data path 58. For example, a timing delay circuit known to persons skilled in the art may be used to produce a 125 MHz internal signal based on a 25 MHz input clock.

When a PHY transceiver employs a 25 MHz or 10 MHz input reference clock to provide the timing reference for transmit data, the repeater that provides the transmit data should be supplied with the corresponding input reference clock to maintain synchronization between data transmit operations in the repeater and the PHY transceiver.

The 100 MHz signal at the output of the APLL 102 may also be used to produce the transmit clock signal TX_CLK in the serial MII mode. Via a frequency divider by 10 106 and a multiplexer 108, the APLL output is transferred to the transmit clock output to produce the TX_CLK signal at 10 MHz.

In the parallel MII mode for 10 Mb/s data, the 25 MHz input clock CLK_25 is transferred via a divider by 10 110 and the multiplexer 108 to produce the TX_CLK signal at 2.5 MHz. The multiplexer 108 may be controlled by the serial mode select signal SERIAL10 to produce the transmit clock output TX_CLK either at 10 MHz or at 2.5 MHz. For 100 Mb/s data, the 25 MHz input reference clock CLK_25 may be buffered to produce a 25 MHz transmit clock TX_CLK, which is a buffered copy of the CLK_25 signal.

The clock select input CLK_SEL determines whether the transmit clock output TX_CLK or a selected input reference clock CLK_25/CLK_10 is used to provide the timing reference for the MII transmit data TXD. For example, if the clock select input CLK_SEL is set at a high level, the selected input reference clock CLK_25/CLK_10 is used for synchronizing transmit data TXD. In this case, the transmit clock output TX_CLK is ignored by the repeaters 12 and 14. If the CLK_SEL input is at a low level, the transmit data TXD from the repeater 12 or 14 is referenced to the corresponding transmit clock TX_CLK.

Figure 5:
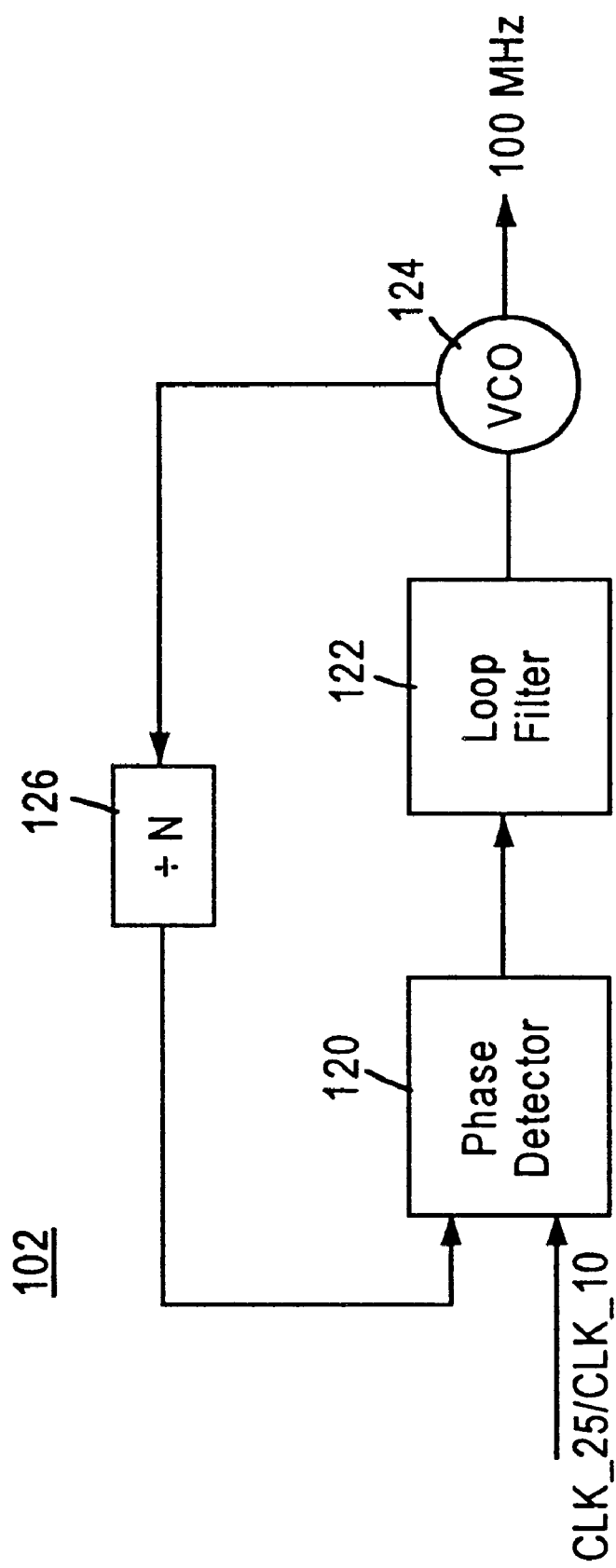
FIG. 5 is an exemplary diagram of an analog phase-locked loop.

FIG. 5 illustrates an exemplary embodiment of the APLL 102 which may comprise a phase detector 120, a loop filter 122, a voltage-controlled oscillator (VCO) 124 and a frequency divider 126. A first input of the phase detector 120 is supplied with an input reference clock CLK_25 or CLK_10 selected in accordance with a MII mode for 10 Mb/s data. In a parallel MII mode, the phase detector 120 is fed with the input clock CLK_25, whereas in a serial MII mode, the input clock CLK_10 is supplied to the phase detector 120.

The VCO 124 may provide a large number of frequencies $$Fout = N \times Fin,$$

where Fin is the frequency of the selected input clock CLK_25/CLK_10, and N is an integer.

Frequency selection is performed by changing the count N. To produce a frequency, at which the phase detector 120 performs phase comparison, the divider 126 divides the output frequency Fout by N. The phase detector 120 compares the phase supplied from the output of the frequency divider 126 with the phase of the selected input clock CLK_25/CLK_10 to generate a phase error voltage.

The loop filter 122 filters the phase error voltage to suppress noise and high-frequency components. Frequency of the VCO 124 is determined by a control voltage produced at the output of the loop filter 122. In response to the control voltage, the VCO 124 deviates from its central frequency to reduce the phase error.

A value of count N is selected to obtain a desired output frequency. In particular, when the MII operates in a parallel mode and a 25 MHz input clock CLK_25 is selected, count N=4 enables the APLL 102 to produce a desired 100 MHz signal used for driving the wave shaper 104. If the MII is switched into a serial mode and the 10 MHz input clock CLK_10 is supplied to the APLL 102, count N is increased to 10, in order to maintain the required 100 MHz signal.

Thus, when the MII switches from one mode to another, the frequency of the signal driving the wave shaper 104 is maintained fixed. As a result, in any mode of MII operations, the PHY transceivers 16a and 16 are enabled to use a selected input reference clock to provide the timing reference for transmit data.

In this disclosure, there are shown and described only the preferred embodiments of the invention, but it is to be understood that the invention is capable of changes and modifications within the scope of the inventive concept as expressed herein.

What is claimed is:
1. A network transceiver for transferring network signals between a repeater and a link partner provided on a network medium, the transceiver comprising:
   a physical layer device,
   an interface for transferring transmit data from the repeater to the physical layer device,
   a first clock input for providing a first reference clock signal, a second clock input for providing a second reference clock signal, and a transmit data referencing circuit for selectively applying the first or the second reference clock signal as a timing reference for transfer of the transmit data.

2. The transceiver of claim 1, wherein the interface is a media independent interface (MII) conforming to IEEE Std. 802.3.

3. The transceiver of claim 1, wherein the transmit data referencing circuit is arranged to reference the transmit data to the first reference clock signal when the interface operates at a first data rate.

4. The transceiver of claim 3, wherein the transmit data referencing circuit is arranged to reference the transmit data to the second reference clock signal when the interface operates at a second data rate.

5. The transceiver of claim 1, wherein the interface is arranged for transferring a transmit clock output signal to the repeater.

6. The transceiver of claim 5, further comprising a clock select input for enabling a user to employ the transmit clock output signal to provide a timing reference for transfer of the transmit data when the clock select input is in a first state, and for selectively referencing the transmit data to the first or the second reference clock signal when the clock select input is in a second state.

7. The transceiver of claim 1, wherein the transmit data referencing circuit comprises a phase-locked loop for producing an internal clock signal at a fixed preset frequency in response to the first or the second reference clock signal.

8. The transceiver of claim 7, wherein the physical layer device comprises a wave shaper for transforming the transmit data into a format appropriate for the link partner.

9. The transceiver of claim 8, wherein the wave shaper is driven by the internal clock signal produced by the phased-locked loop.

10. The transceiver of claim 9, wherein the phase-locked loop comprises a phase detector having a first input for receiving the first or the second reference clock signal.

11. The transceiver of claim 10, wherein the phase-locked loop further comprises a frequency divider coupled between a voltage-controlled oscillator and a second input of the phase detector.

12. The transceiver of claim 11, wherein the frequency divider is arranged to divide a frequency of the voltage-controlled oscillator by a first factor when the first reference clock signal is supplied to the phase detector.

13. The transceiver of claim 12, wherein the frequency divider is arranged to divide the frequency of the voltage-controlled oscillator by a second factor when the second reference clock signal is supplied to the phase detector.

14. The transceiver of claim 13, wherein the first and the second factors are selected to maintain the fixed preset frequency at the output of the voltage-controlled oscillator when the first or the second reference clock signal is supplied to the phase detector.

15. In an Ethernet network, a method of transferring network data between a repeater and a link partner provided on a network medium, comprising the steps of:

arranging a media independent interface (MII) for transferring transmit data from the repeater to a physical layer device, supplying the physical layer device with first and second input clock signals for respectively providing first and second reference clock signals, and selectively applying the first or the second reference clock signal as a timing reference for transfer of the transmit data.

16. The method of claim 15, wherein the transmit data is referenced to the first reference clock signal when the MII operates at a first data rate, and to the second reference clock signal when the MII operates at a second data rate.

17. The method of claim 15, wherein a transmit clock output signal is transferred to the repeater.

18. The method of claim 17, further comprising the step of supplying the physical layer device with a clock select input signal for enabling a user to employ the transmit clock output signal to provide a timing reference for transfer of the transmit data when the clock select input is in a first state, and for selectively referencing the transmit data to the first or the second reference clock signal when the clock select input is in a second state.

19. The method of claim 15, further comprising the step of transforming the transmit data into a format appropriate for the link partner.

20. The method of claim 19, wherein the step of transforming is controlled by an internal clock signal produced at a fixed preset frequency in response to the first or the second reference clock signal.

* * * * *